United States Patent
Sato et al.

(10) Patent No.: US 7,012,959 B2
(45) Date of Patent: Mar. 14, 2006

(54) PICTURE INFORMATION CONVERSION METHOD AND APPARATUS

(75) Inventors: Kazushi Sato, Kanagawa (JP); Kuniaki Takahashi, Kanagawa (JP); Teruhiko Suzuki, Chiba (JP); Yoichi Yagasaki, Tokyo (JP)

(73) Assignee: Sony Corporation (JP)

( * ) Notice: Subject to any disclaimer, the term of this patent is extended or adjusted under 35 U.S.C. 154(b) by 939 days.

(21) Appl. No.: 09/862,421

(22) Filed: May 23, 2001

(65) Prior Publication Data

US 2002/0034247 A1 Mar. 21, 2002

(30) Foreign Application Priority Data

May 25, 2000 (JP) .................................... P2000-155400

(51) Int. Cl.
*H04N 7/12* (2006.01)
*H04N 11/02* (2006.01)

(52) U.S. Cl. ................................................ 375/240.03
(58) Field of Classification Search .............. 348/384.1, 348/407, 409, 412, 445, 424, 695, 696, 600, 348/845.1, 845.2; 375/240.03, 240.12, 240.21, 375/240.02, 240.16
See application file for complete search history.

(56) References Cited

U.S. PATENT DOCUMENTS

| | | | | |
|---|---|---|---|---|
| 5,565,921 A | * | 10/1996 | Sasaki et al. ............... | 348/409 |
| 6,167,088 A | * | 12/2000 | Sethuraman .............. | 375/240.1 |
| 6,327,306 B1 | * | 12/2001 | Sugiyama ............... | 375/240.21 |
| 6,590,936 B1 | * | 7/2003 | Kadono .................. | 375/240.12 |
| 6,590,938 B1 | * | 7/2003 | Azadegan et al. ...... | 375/240.21 |
| 6,888,889 B1 | * | 5/2005 | Sato et al. ............. | 375/240.12 |
| 2001/0010706 A1 | * | 8/2001 | Sato et al. ............. | 375/240.12 |
| 2002/0106024 A1 | * | 8/2002 | Sato et al. ............. | 375/240.12 |
| 2004/0218671 A1 | * | 11/2004 | Haraguchi et al. ...... | 375/240.12 |
| 2005/0089096 A1 | * | 4/2005 | Sato et al. ............. | 375/240.12 |

OTHER PUBLICATIONS

"Field–to–Frame Transcoding with Spatial and Temporal Downsampling", Susie L. Wee, John G. Apostolopoulos, and Nick Feamster, ICIP 99.

* cited by examiner

*Primary Examiner*—Chris Kelley
*Assistant Examiner*—Behrooz Senfi
(74) *Attorney, Agent, or Firm*—Rader, Fishman & Grauer PLLC; Ronald P. Kananen

(57) ABSTRACT

Stable code rate control is performed in converting picture information. MPEG2 interlaced scanned compressed picture information (bitstream) is converted into the progressive scanned MPG4 compressed picture information (bitstream). An activity synthesis unit 15 synthesizes from the activity-based activity information in the MPEG2 compressed picture information (bitstream) the macroblock-based activity information in the MPEG4 compressed picture information (bitstream). An MPEG4 picture information encoding unit (I/P-VOP) 11 uses the so-synthesized activity information as the parameter for adaptive quantization at the time of encoding the MPEG4 picture information.

21 Claims, 6 Drawing Sheets

A

MPEG2 COMPRESSED
PICTURE INFORMATION
(BITSTREAM)
4 MACROBLOCKS

B

MPEG4 COMPRESSED
PICTURE INFORMATION
(BITSTREAM)
1 MACROBLOCK

PICTURE INFORMATION CONVERSION METHOD AND APPARATUS

BACKGROUND OF THE INVENTION

1. Field of the Invention

This invention relates to a method and apparatus for converting picture information. More particularly, it relates to a picture information conversion method and apparatus for use in receiving picture information of, e.g., MPEG pictures compressed by orthogonal transform, such as discrete cosine transform, and motion compression (bitstream), over a broadcast satellite, cable TV or a network medium, such as the Internet, or in processing the bitstream on a recording medium, such as an optical disc or a magneto-optical disc.

2. Description of Related Art

There has so far been presented a picture information compression system, such as MPEG, for compressing the picture information by motion compression, by exploiting the redundancy proper to the picture information, and with a view to handling the picture information as digital data and to high-efficiency transmission and storage of the information. The apparatus conforming to this picture information compression method is finding widespread use in information distribution by, e.g., a broadcasting station and in information reception in homes.

In particular, the MPEG2 (ISO/IEC 13818-2) is defined as being a comprehensive picture encoding system applicable to both interlaced and progressive scanned pictures, to standard definition pictures, and to high-definition pictures.

That is, in the MPEG2 encoding compression system, codes of a bitrate of 4 to 8 Mbps are allocated to an interlaced scanned picture of a standard resolution with 720×480 pixels, and codes of a bitrate of 18 to 22 Mbps are allocated to a progressive scanned picture of a standard resolution with 1920×1088 pixels to realize a high compression factor and a high picture quality.

In light of the above, the MPEG2 is estimated to continue to be in extensive use in professional and consumer use.

However, the MPEG2 is mainly intended for high picture quality encoding for broadcasting, while it is not adapted to a coderate lower than that in MPEG 1, that is, it is not adapted to an encoding system with a higher compression rate.

On the other hand, it may be predicted that the need for an encoding system with a higher compression rate will continue to increase. In order to cope with this situation, standardization of the MPEG4 encoding system with a high compression rate is underway. For this picture encoding system, the international standardization was acknowledged in December 1998 as ISO/IEC 14496–2.

Meanwhile, there also exists the need for converting the MPEG2 compressed picture information, once encoded for digital broadcast, into compressed picture information (bitstream) of a lower code rate more amenable to processing on a portable terminal.

For accommodating these needs, there is presented a picture information converting apparatus (transcoder) in "Field-to-Frame Transcoding with Spatial and Temporal Downsampling" (Susie L. Wee, John G. Apostolopoulos, and Nick Feamster, ICIP 99; referred to below as reference 1).

As shown in FIG. 1, the picture information converting apparatus (transcoder) presented in this reference 1 is made up of a picture type decision unit 1, an MPEG2 picture information decoding unit (I/P picture) 2, a decimating unit 3, an MPEG2 picture information encoding unit (I/P-VOP)4, a motion vector synthesis unit 5 and a motion vector detection unit 6.

This picture information converting apparatus is fed with the interlaced scanned MPEG2 compressed picture information (bitstream) made up of an intra-coded picture (I-picture) obtained on intra-frame coding, a forward predicted picture (P-picture) obtained on predictive coding by referring to a forward direction in the display sequence, and a bi-directionally coded picture (B-picture) obtained on predictive coding by referring to the forward and backward directions in the display sequence.

This MPEG2 compressed picture information (bitstream) is discriminated in the picture type decision unit 1 as to whether it is of an I/P picture or of a B-picture. Only the I/P picture is output to the next following MPEG2 picture information decoding unit (I/P picture) 2, while the B-picture is discarded.

Similarly to the processing in a routine MPEG2 picture information decoding unit, the processing in the MPEG2 picture information decoding unit (I/P picture) 2 decodes the MPEG2 compressed picture information (bitstream) into picture signals, The pixel value output by the MPEG2 picture information decoding unit (I/P picture) 2 is input to the decimating unit 3, which then decimates the pixel value by ½in the horizontal direction, while leaving only one of the data of the first field and the data of the second field and discarding the other. By this decimation, there is produced a progressive scanned picture having a size equal to ¼of the input picture information.

The progressive scanned picture generated by the decimating unit 3 is encoded by the MPEG2 picture information encoding unit (I/P-VOP) 4 into an intra-frame-coded I-VOP and a P-VOP obtained on predictive coding by referring to the forward direction in the display sequence, and it is output as the MPEG4 compressed picture information (bitstream). Meanwhile, VOP means a video object plane and is equivalent to a frame in MPEG2.

The motion vector information in the input MPEG2 compressed picture information (bitstream) is mapped in the motion vector synthesis unit 5 into a motion vector for the as-decimated picture information. The motion vector detection unit 6 detects the high precision motion vector based on the motion vector value synthesized in the motion vector synthesis unit 5.

Reference 1 discusses a picture information converting apparatus for generating the MPEG2 compressed picture information (bitstream) having a size equal to ½×½of the input MPEG2 compressed picture information (bitstream). That is, if the input MPEG2 compressed picture information (bitstream) is in meeting with the NTSC (National Television System Cornmittee), the output MPEG4 compressed picture information (bitstream) is of an SIF size (352×240 pixels).

Meanwhile, in the picture information converting apparatus shown in FIG. 1, the code rate control in the MPEG4 picture information encoding unit (I/P-VOP) 4 represents a significant factor in determining the picture quality in the MPEG4 compressed picture information. In the ISO/IEC 14496–2, there is no particular definition as to the coderate controlling system, such that each vendor may use a system that is possibly optimal from the viewpoint of the processing volume and the output picture quality depending on the particular application. The system discussed in MPEG2 Test Model 5(ISO/IEC JTCI/SC29/WG11 NO400) is hereinafter explained as a typical coderate controlling system.

The code rate control flow is now explained by referring to the flowchart of FIG.2. At a first step S11, the picture information encoding unit (I/P-VOP)4 allocates bits to each picture, with the target code rate (target bitrate) and the GOP (group of pictures) as input variables. It is noted that a GOP means a set ofpictures accessible at random.

That is, at step S11, the picture information encoding unit (I/P-VOP) 4 distributes bits to be allocated to each picture in the GOP based on the volume of bits allocated to a picture not as yet decoded in the GOP inclusive of pictures intended for allocation. This bit volume is referred to below as R. This distribution is repeated in the sequence of the encoded pictures in the GOP. In this case, coderate allocation to each picture is made using two assumptions as now explained.

It is first assumed that the product of an average quantization scale code used in encoding each picture and the volume of the codes generated is unchanged from one picture type to another as long as the picture displayed is not changed. Based on this supposition, variables $X_i$, $X_p$ and $X_b$ representing the picture complexity (global complexity measure) are updated after encoding each picture in accordance with the following equation (1) from one picture type to another:

$$X1 = S_i Q_i$$

$$X_p = S_p Q_p$$

$$X_b = S_b Q_b \quad (1)$$

It is noted that $S_i$, $S_p$ and $S_b$ denote the volumes of the codes generated on picture encoding, and $Q_i$, $Q_p$ and $Q_b$ are average quantization scale codes at the time of picture encoding. On the other hand, the initial value, in terms of the target bitrate bit_rate [bits/sec], is as indicated in the following equation (2):

$$X_i = 160 \times \text{bit\_rate}/115$$

$$X_p = 60 \times \text{bit\_rate}/115$$

$$X_b = 42 \times \text{bit\_rate}/115 \quad (2)$$

Second, it is assumed that the overall picture quality is optimized at all times when the proportions Kp, Kb of the quantization scale code of the P- and B-pictures, referenced to the quantization scale code of an I-picture, are of values defined in the following equation (3):

$$K_p = 1.0; K_b = 1.4 \quad (3)$$

That is, the quantization scale code of a B-picture is set at all times so as to be 1.4 times the quantization scale codes of the I- and P-pictures. This is, based on the supposition that if the volume of the codes that can be saved in a B-picture by encoding the B-picture slightly more coarsely than the I- and P-pictures is added to the code volume of the I- and P-pictures, the I- and P-pictures can be improved in picture quality, so that the B-picture which refers to these also can be improved in picture quality.

From the above-mentioned twoassumptions, the volumes of bits allocated to each picture of the GOP ($T_i$, $T_p$, $T_b$) are as indicated by the following equation (4):

$$T_i = \max\left\{\frac{R}{1 + \frac{N_p \cdot X_p}{X_i \cdot K_p} + \frac{N_b \cdot X_b}{X_i \cdot K_b}}, \frac{\text{bit\_rate}}{8 \times \text{picture\_rate}}\right\} \quad (4)$$

$$T_p = \max\left\{\frac{R}{N_p + \frac{N_b \cdot K_p \cdot X_b}{K_b \cdot X_p}}, \frac{\text{bit\_rate}}{8 \times \text{picture\_rate}}\right\}$$

$$T_b = \max\left\{\frac{R}{N_b + \frac{N_p \cdot K_b \cdot X_p}{K_p \cdot X_b}}, \frac{\text{bit\_rate}}{8 \times \text{picture\_rate}}\right\}.$$

where Np and Nb denote the number of P- and B-pictures, respectively, not as yet encoded in the GOP.

Based on the value of the allocated codes thus found, the Volume of bits R allocated to uncoded pictures in a GOP is updated in accordance with the following equation (5) each time a picture is encoded in accordance with steps 511 and 512:

$$R = R - S_{i,p,b} \quad (5)$$

On the other hand, in encoding the first picture of the GOP, R is updated in accordance with the equation (6):

$$R = \frac{\text{bit\_rate} \times N}{\text{picture\_rates}} + R \quad (6)$$

where N is the number of pictures in a GOP. The initial value of R at the beginning of a sequence is 0.

Then, at step S12, the picture information encoding unit (I/P-VOP) 4 performs rate control using a virtual buffer. That is, at step S12, the picture information encoding unit (I/P-VOP) 4 finds the quantization scale code by macroblock based feedback control, based on the capacitance of three types of the virtual buffer set independently for the respective pictures, in order to make the volume of allocated bits for the respective pictures found by the equation (4) at step S11($T_i$, $T_p$, $T_b$) coincident with the actual volume of generated codes.

Before proceeding to the encoding of the jth macroblock, the occupancy volume of the virtual buffer is found by the following equation (7):

$$d_j^i = d_o^i + B_{j-1} - \frac{T_1 \times (j-1)}{\text{MB\_cnt}} \quad (7)$$

$$d_j^p = d_o^p + B_{j-1} - \frac{T_p \times (j-1)}{\text{MB\_cnt}}$$

$$d_j^b = d_o^b + B_{j-1} - \frac{T_b \times (j-1)}{\text{MB\_cnt}}$$

It is noted that $do^i$, $do^p$, $do^b$ are initial occupancy volumes ofthe virtual buffers, $B_j$ is the volume of bits generated from the leading end of a picture up to thejth macro-block and MB_cnt is the number of macroblocks in one picture. The occupancy ofthe virtual buffer at the time of end of encoding of each picture (dMB_cnt$^i$, dMB_cnt$^p$, dMB_cnt$^b$) is used as initial values ($do^i$, $do^p$, $do^b$) of the occupancy of the virtual buffer for the next picture in the same picture type.

The quantization scale code for the jth macroblock is then calculated in accordance with equation (8):

$$Q_j = \frac{d_j \times 31}{r} \quad (8)$$

where r is a variable controlling the feedback loop response, termed a reaction parameter, and is given by equation (9):

$$r = 2 \times \frac{bit\_rate}{picture\_rate}. \quad (9)$$

Meanwhile, the initial value of the virtual buffer at the time of beginning the equation (10):

$$d_o^i = 10 \times \frac{r}{31} \quad (10)$$
$$d_o^p = K_p \cdot d_o^i$$
$$d_o^b = K_{pb} \cdot d_o^i,$$

Finally, at S 13, the picture information encoding unit (I/P-VOP) 4 performs macro-block based adaptive quantization taking psychoacoustic characteristics into account. That is, at step S13, the picture information encoding unit (I/P-VOP) 4 varies the quantization scale code found at step S12 by a variable termed macroblock-based activity in such a manner that the quantization scale code will be quantized finely and coursely in a monotonous pattern portion where deterioration tends to be visually outstanding and in complex pattern portion where deterioration is less likely to be outstanding, respectively.

The activity is given, using luminance signal pixel values of an original picture, four blocks in the frame DCT mode and four blocks in the field DCT mode, totaling eight blocks, by the following equation (11):

$$act_j = 1 + \min_{sblk=1,8}(var\_sblk) \quad (11)$$

$$var\_sblk = \frac{1}{64}\sum_{k=1}^{64}(P_k - \overline{P})^2$$

$$\overline{P} = \frac{1}{64}\sum_{k=1}^{64}P_k$$

where $P_k$ is a pixel value in a luminance signal block of an original picture. The purpose of taking a minimum value in equation (11) is to refine the quantization if there is a monotonous pattern portion even in a portion of the macroblock.

The normalized activity $Nact_j$, the value of which assumes a value in a range from 0.5 to 2, is found by equation (12):

$$Nact_j = \frac{2 \times act_j + avg\_act}{act_j + 2 \times avg\_act} \quad (12)$$

where avg_act is an average value of $act_j$ in a picture encoded directly previously.

The quantization scale code $mquant_j$, which takes psychoacoustic characteristics into account, is given based on the quantization scale code $Q_j$ obtained at step S12 in accordance with the following equation (13):

$$mquant_j = Q_j \times Nact_j \quad (13)$$

The above-described code volume controlling system, defined in MPEG2 Test Model 5, is known to suffer from the following limitations, such that, in actual control, measures need to be taken against these limitations. That is, the first limitation is that the first step S11 cannot cope with a scene change and, after a scene change, the parameter avg_act used at step S13 takes on an incorrect value. The second limitation is that there is no assurance that the constraint condition of VBV (video buffer verifier), as provided in MPEG2 and MPEG4, can be met.

Meanwhile, in the execution of the equation (11), it is necessary to calculate the totality of the average values and variance values of the pixel values for each macroblock, thus necessitating voluminous processing operations. There also are occasions where the fact that avg_act in the equation (12) is not an average value in the frame but is an average value in the directly previous frame and it obstructs stable coderate control.

SUMMARY OF THE INVENTION

It is therefore an object of the present invention to provide a picture information converting method and apparatus whereby the processing volume in calculating the activity is diminished to assure stabilized coderate control.

The present invention provides a method and apparatus for converting interlaced scanned compressed picture information, compressed in accordance with a first compression coding system, into progressive scanned output compressed picture information, compressed in accordance with a second compression coding system. The second activity information of a pixel block constituting a frame of the output compressed picture information is synthesized with the use of the first activity information constituting a frame of the input compressed picture information. The second activity information, so synthesized, is used as a parameter of adaptive quantization at the time of compression in the second compression encoding system.

According to the present invention, the interlaced scanned MPEG2 compressed picture information (bitstream) is the input compressed picture information, while the progressive scanned MPEG4 compressed picture information (bitstream) is the output compressed picture information. Each of the MPEG2 compressed picture information and the MPEG4 compressed picture information is constituted by pixel blocks, that is macroblocks, each being composed of plural pixels.

According to the present invention, the interlaced scanned MPEG2 compressed picture information (bitstream) is an input. There are provided a picture type decision unit, an MPEG2 picture information decoding unit (I/P picture), a decimating unit, a delay buffer, an MPEG4 picture information encoding unit (I/P-VOP), a motion vector synthesis unit, a motion vector detection unit, an information buffer and an activity synthesis unit. Using the pixel block based, that is macroblock-based, activity information extracted from the MPEG2 compressed picture information (bitstream) as the input compressed picture information, the MPEG4 present invention encoding (I/P-VOP) is performed to output the MPEG4 compressed picture information (bitstream), serving as progressive scanned output compressed picture information, in an optimized macroblock-based coderate allocation with a smaller processing volume. It also is possible to eliminate the delay buffer 10 and provide a compressed information analysis unit.

In the above-described structure, the picture type decision unit leaves only the I/P picture relevant portion in the input MPEG2 compressed picture information (bitstream), as the B-picture relevant portion is discarded. The compressed picture information (bitstream) pertinent to the I/P picture output from the picture type decision unit is decoded using all of the order eight DCT coefficients, or only low frequency coefficients, for both the horizontal and vertical directions. The decimating unit takes out only the first field or the second field of the picture information output from the MPEG2 picture information decoding unit (I/P picture) for conversion to the progressive scanned picture while performing downsampling for conversion to a desired picture frame size. The delay buffer stores the picture information for one frame. The MPEG4 picture information encoding unit (I/P-VOP) encodes the picture information output from the delay buffer in accordance with the MPEG4 encoding system. The motion vector synthesis unit effects mapping into motion vector values corresponding to the scanning-converted picture data based on the motion vector value in the input compressed picture information (bitstream) detected by the MPEG2 picture information decoding unit (I/P picture). The motion vector detection unit detects the motion vector to high precision based on the motion vector value output from the motion vector synthesis unit. The information buffer extracts the macroblock-based activity information obtained in performing decoding in the MPEG2 picture information decoding unit (I/P picture) and stores the extracted information therein. The activity synthesis unit synthesizes from the macroblock-based activity information in the input MPEG2 compressed picture information (bitstream) stored in the information buffer the macroblock-based activity information in the output MPEG4 compressed picture information (bitstrearn) and transmits the synthesized activity information to the MPEG4 picture information encoding unit (I/P-VOP).

According to the present invention, as described above, the interlaced scanned MPEG2 compressed picture information (bitstream) is used as input and, from the activity information for respective macroblocks, the activity information for each macroblock in the output MPEG4 compressed picture information (bitstream) is synthesized and used for adaptive quantization. The input MPEG2 compressed picture information (bitstream) may be converted in this manner into the progressive scanned MPEG4 compressed picture information (bitstream) in optimized macroblock-based coderate allocation with a smaller processing volume.

DESCRIPTION OF THE PREFERRED EMBODIMENTS

Figure 1:
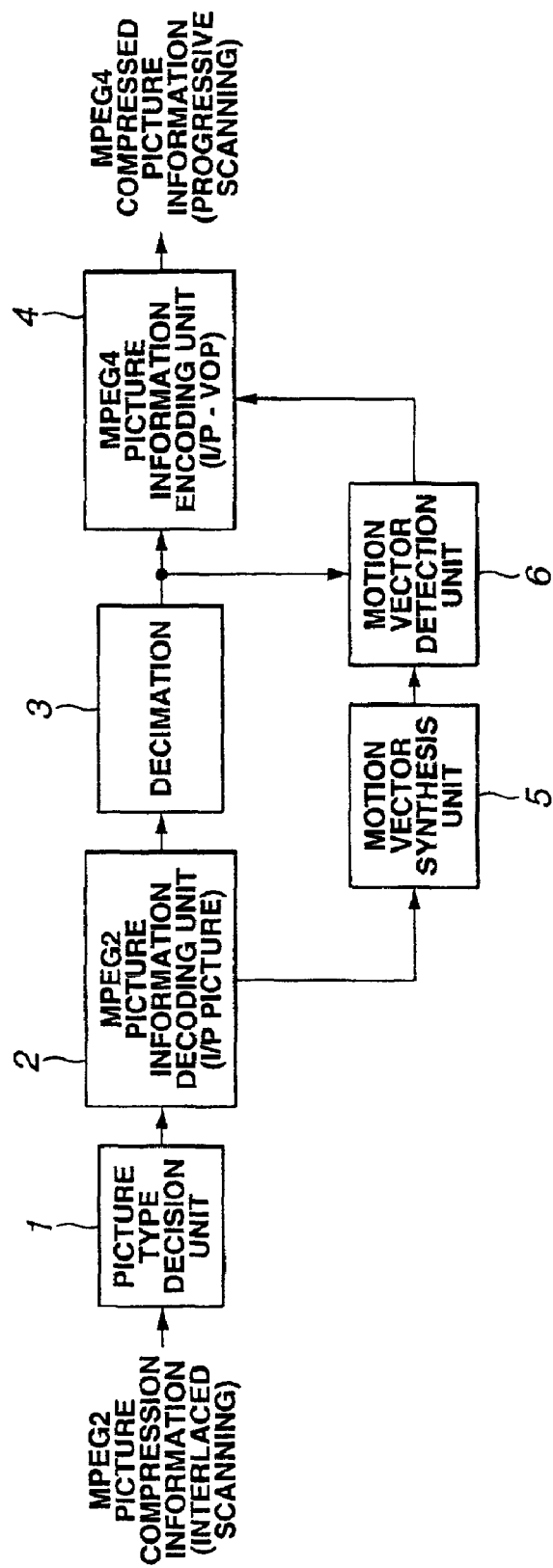
FIG. 1 is a block diagram showing the structure of a picture information converting apparatus according to a first embodiment of the present invention.
Figure 2:
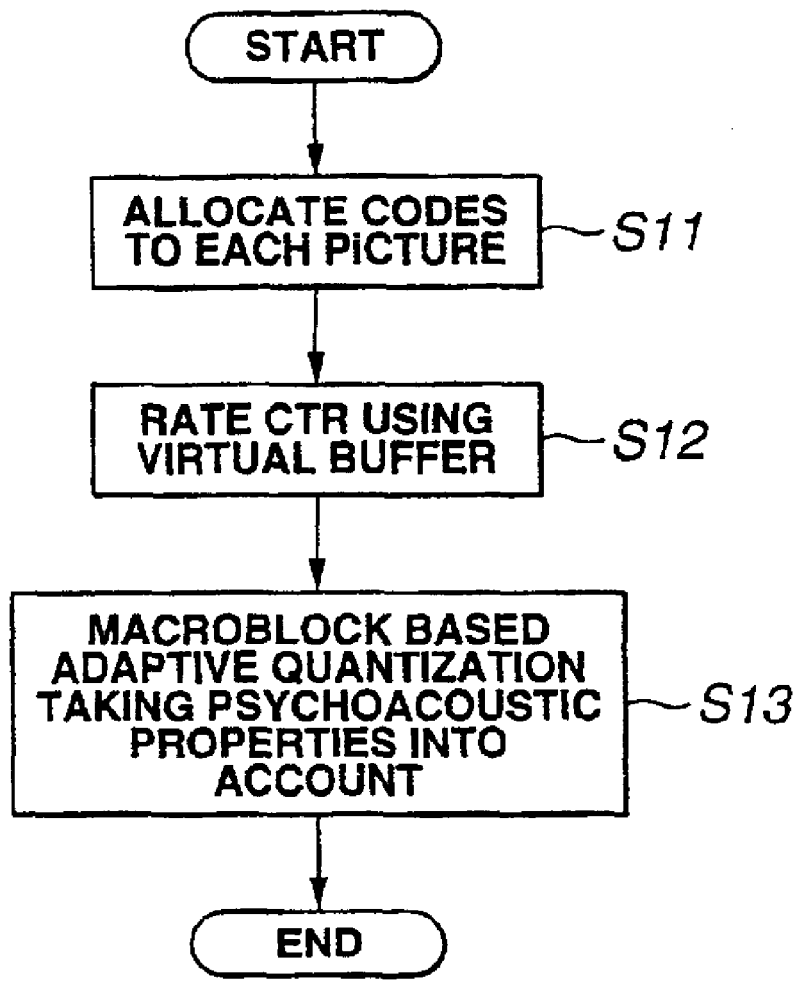
FIG. 2 illustrates a method for generating the activity information $Act_j$.

Referring to the drawings, preferred embodiments of the present invention will be explained in detail.

First, a picture information converting apparatus according to a first embodiment of the present invention is explained.

Figure 3:
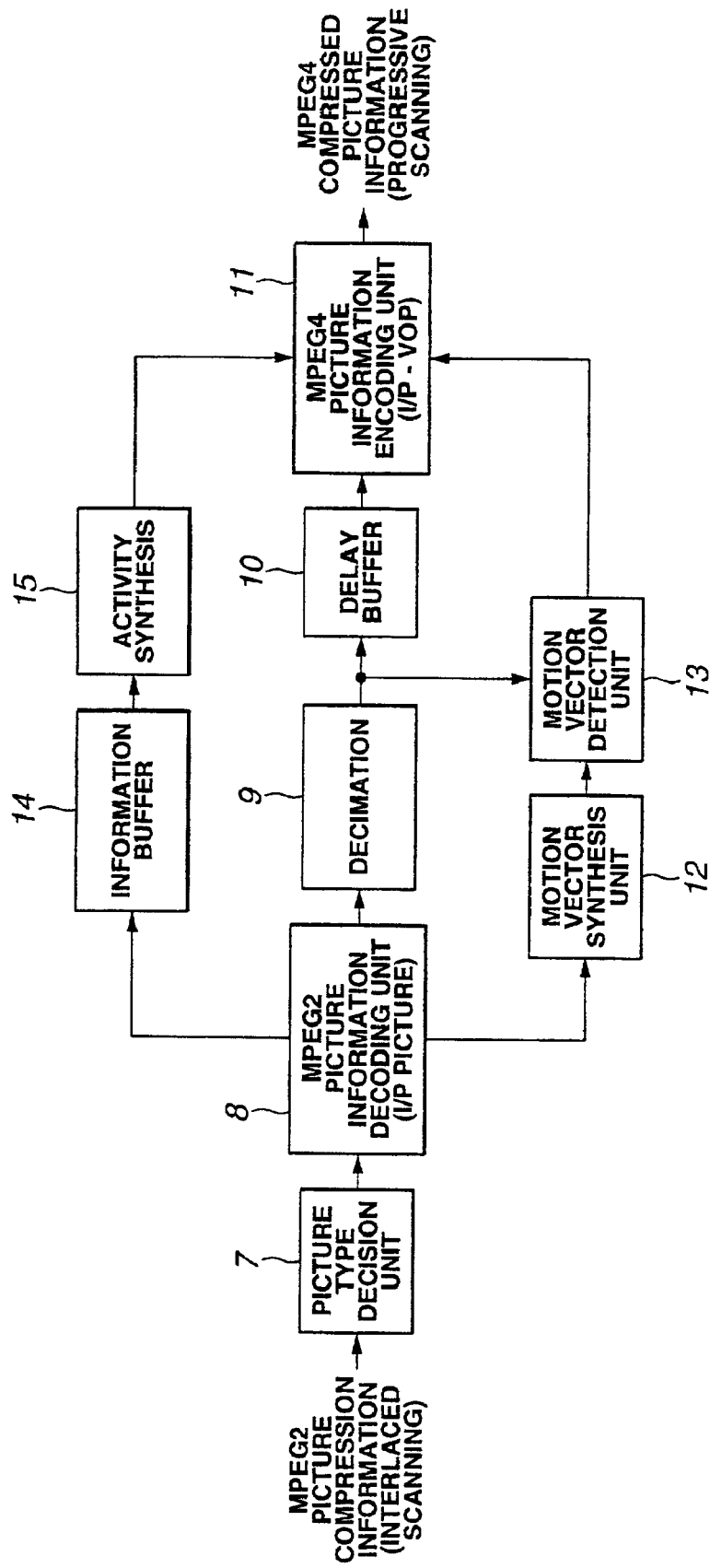
FIG. 3 is a flowchart for illustrating the operating principle of the quantization processing used.

Referring to FIG. 3, the picture information converting apparatus includes a picture type decision unit 7, an MPEG2 picture information decoding unit (I/P picture) 8, a decimating unit 9, a delay buffer 10, an MPEG2 picture information encoding unit (I/P-VOP) 11, a motion vector synthesizing unit 12, an information buffer 14 and an activity synthesis unit 14.

This picture information converting apparatus is fed with the interlaced scanned MPEG2 compressed picture information (bitstrearn) made up of an intra-coded picture (I-picture) obtained on intra-frame coding, a forward predicted picture (P-picture) obtained on predictive coding by referring to theforward direction in the display sequence, and a bi-directionally coded picture (B-picture) obtained on predictive coding by referring to the forward and backward directions in the display sequence.

This MPEG2 compressed picture information (bitstream) is discriminated in the picture type decision unit I as to whether it is of an I/P picture or of a B-picture. Only the I/P picture is output to the next following MPEG2 picture information decoding unit (I/P picture) 2, while the B-picture is discarded.

The MPEG2 picture information decoding unit (I/P) 8 decodes the MPEG2 compressed picture information (bitstream) into picture signals, while extracting the activity information, and routes the resulting information to the information buffer 14. Since the data on the B-picture has been discarded in the picture type decision unit 7, it is sufficient for the MPEG2 picture information decoding unit (I/P) 8 to have the function only of decoding the I/P picture.

The pixel value output by the MPEG2 picture information decoding unit (I/P picture) 8 is input to the decimating unit 9, which then decimates the pixel value by ½in the horizontal direction, while leaving only one of the data of the first field and the data of the second field and discards the other. By this decimation, there is produced a sequentially scanned picture having a size equal to ¼of the input picture infonnation. Meanwhile, for encoding the picture output from the decimating unit 9 in the MPEG4 picture information encoding unit (I/P-VOP) 11 in terms of a macro-block composed of 16×16 pixels as a unit, the number of pixels of the picture needs to be multiples of 16 in both the horizontal and vertical directions. The decimating unit 9 interpolates or discards the pixels simultaneously with decimation.

For example, if the input MPEG2 compressed picture information (bitstream) conforms to the standard of the NTSC (National Television System Committee), that is an interlaced scanned picture with 720×480 pixels and 30 Hz, the as-decimated picture frame is of the SIP size (360×240 pixels). This picture is turned into 352×240 pixels by discarding eight lines, e.g., at the right or left end in the horizontal direction in the decimating unit 9.

The picture may also be converted into, e.g., a picture of the QSIF size (176×112 pixels), which is a picture frame of approximately ¼×¼, by changing the operation in the decimating unit 9.

The above-mentioned reference 1 is directed to a picture information converting apparatus in which the processing in the MPEG2 picture information decoding unit (I/P) 8 is the decoding operation employing all of the order eight DCT coefficients in the input MPEG2 compressed picture information for both the horizontal and vertical directions. The apparatus shown in FIG. 1 is not limited to this configuration. For example, the apparatus shown in FIG. 3 also may be designed to execute decoding using only low-frequency components of the order eight DCT coefficients for only the horizontal or vertical direction of both the horizontal and vertical directions to suppress the deterioration in the picture quality to a minimum and to decrease the processing volume accompanying the decoding processing and the video memory capacity.

The progressive scanned picture generated by the decimating unit 9 is delayed one frame by the delay buffer 10 and subsequently encoded by the MPEG4 picture information encoding unit (I/P-VOP) 11 into an intra-frame-coded I-VOP and a P-VOP, predictively coded by referring to the forward direction in the display sequence, so as to be output as the MPEG4 compressed picture information (bitstream).

The motion vector information in the input MPEG2 compressed picture information (bitstream) is mapped in the motion vector synthesizing unit 12 into a motion vector with respect to the as-decimated picture information. A motion vector detection unit 13 detects the high-precision motion vector based on the motion vector value synthesized in the motion vector synthesizing unit 12.

The VOP means a video object plane and is equivalent to a frame in MPEG2. The I-VOP, P-VOP and B-VOP mean an intra-coded VOP corresponding to an I-picture, a forward predictive-coded VOP corresponding to a P-picture and a bi-directionally predictive-coded VOP corresponding to a B-picture, respectively.

In this picture information converting apparatus, the macroblock-based activity information in the input MPEG2 compressed picture information (bitstream) is sent from the MPEG2 picture information decoding unit (I/P) 8 to the information buffer 14 so as to be stored by one frame therein. The activity information used here may be one of those found by the following six methods:

The first method uses the macroblock-based quantization scale Q in the MPEG2 compressed picture informnation (bitstream). The second method is to use the code volume (number of bits) allocated to the macro-block based luminance component DCT coefficients in the input MPEG2 compressed picture information (bitstrearn). The third method is to use the code volume (number of bits) allocated to the macro-block based DCT coefficients in the input MPEG2 compressed picture information (bitstream). The fourth method is to use the code volume (number of bits) allocated to the macro-block in the input MPEG2 compressed picture information (bitstream). The fifTh method is to use X as given by the following equation (14):

$$X = Q \cdot B \tag{14}$$

where B is the code volume (number of bits) allocated to each macroblock in the input MPEG2 compressed picture information (bitstream).

It is noted that B may be the entire code volume (number of bits) allocated to a macroblock, the code volume (number of bits) allocated to the DCT coefficients or the code volume (number of bits) allocated to the luminance component DCT coefficients; and, Q is a quantization scale. The sixth method is to use non-zero DCT coefficients for luminance components or both the luminance and chrominance components in each macroblock in the input MPEG2 compressed picture information (bitstream).

In the following, it is assumed that the MPEG4 compressed picture information (bitstream) of the progressive scanned picture has a ¼picture frame of the MPEG2 compressed picture information (bitstream) of the input progressive scanned picture.

Figure 4:
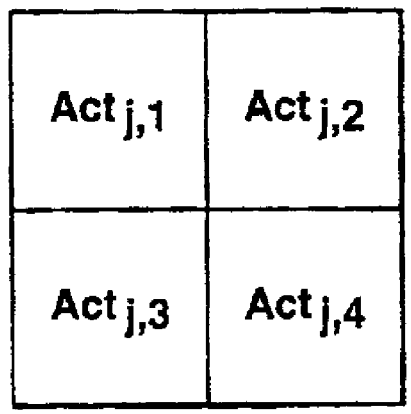
FIG. 4 is a block diagram showing the structure of a picture information converting apparatus according to a second embodiment of the present invention.
Figure 4:
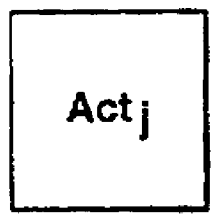

The activity information $Act_j$ for a given macroblock in the output MPEG4 compressed picture information (bitstream) shown at B in FIG. 4 is generated from the activity information $Act_j$, n, where n=1, . . . 4, in the input MPEG2 compressed picture information (bitstream) shown at A in FIG. 4, using an activity synthesis unit 15 in accordance with the following equation (15):

$$Act_j = (Act_{j,1}, Act_{j,2}, Act_{j,3}, Act_{j,4}) \tag{15}$$

where the finction f may be one that outputs an average value, if an input sample, or a minimum value.

The activity synthesis unit 15 calculates the aforementioned macroblock-based information $Act_j$ for the output MPEG4 compressed picture information (bitstream) and an average value Avg_act over the entire VOP of $Act_j$ to output the result to the MPEG4 picture information encoding unit (I/P-VOP) 11. For calculating Avg_act, it is necessary to know $Act_j$ over the entire picture displayed. To this end, the delay buffer 10 is used.

The MPEG4 picture information encoding unit (I/P-VOP) 11 calculates the normalized activity N $Act_j$ for each macroblock using the parameter $Act_j$ as calculated in the activity synthesis unit 15, and the Avg_act, as shown by the following equation (16), in association with the equation (12) to execute the macroblock-based adaptive quantization processing.

$$Nact_j = \frac{2 \times Act_j + \text{Avg\_act}}{Act_j + 2 \times \text{Avg\_act}} \tag{16}$$

Figure 5:
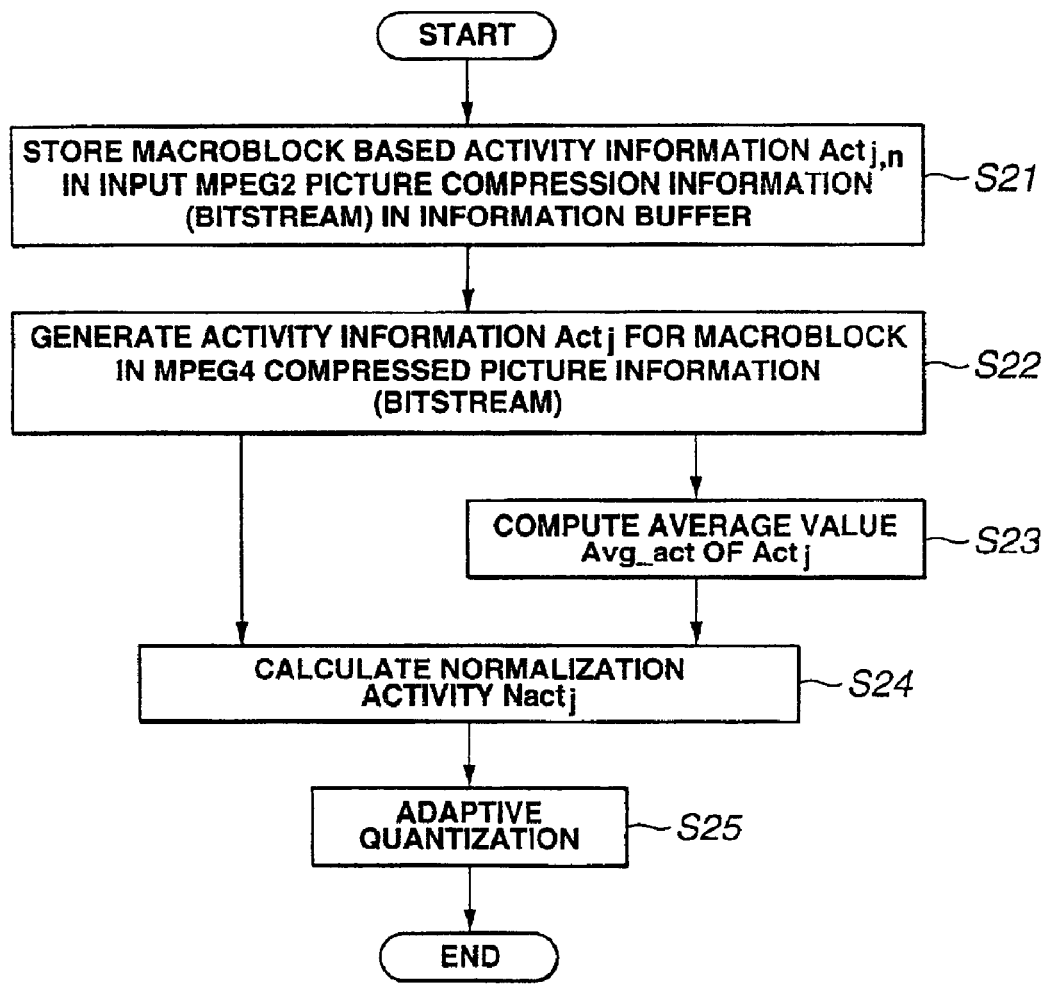
FIG. 5 is a block diagram showing the structure of a conventional picture information converting apparatus.

The sequence of processing operations up to this adaptive quantization is now explained by referring to FIG. 5.

At the first step S25, the macroblock based activity information $Act_{j,n}$ in the input MPEG2 compressed picture information (bitstream) output from the MPEG2 picture information decoding unit (I/P) 8 is stored in the information buffer 14.

At step S22, the activity synthesis unit 15 generates the activity information $Act_j$ for a macroblock in the MPEG4 compressed picture information (bitstream) from the activity information Acti stored in the information buffer 14.

At step S23, the activity synthesis unit 15 calculates the average value Avg_act of the activity information $Act_j$. At step S24, the activity synthesis unit 15 calculates the normalized activity $Nact_j$.

At step S25, the MPEG4 picture information encoding unit 11 executes present invention encoding using the adaptive quantization based on the normalized activity $Nact_j$ supplied from the activity synthesis unit 15.

By executing the above processing, the execution of equation (11) becomes unnecessary, thus diminishing the processing volume. On the other hand, avg_act in equation (11) is an average value for the directly previous VOP, while Avg_act in equation (16) is an average value ofthe VOP in question, thus assuring more stabilized coderate control.

The picture information processing apparatus according to a second embodiment of the present invention is hereinafter explained.

Figure 6:
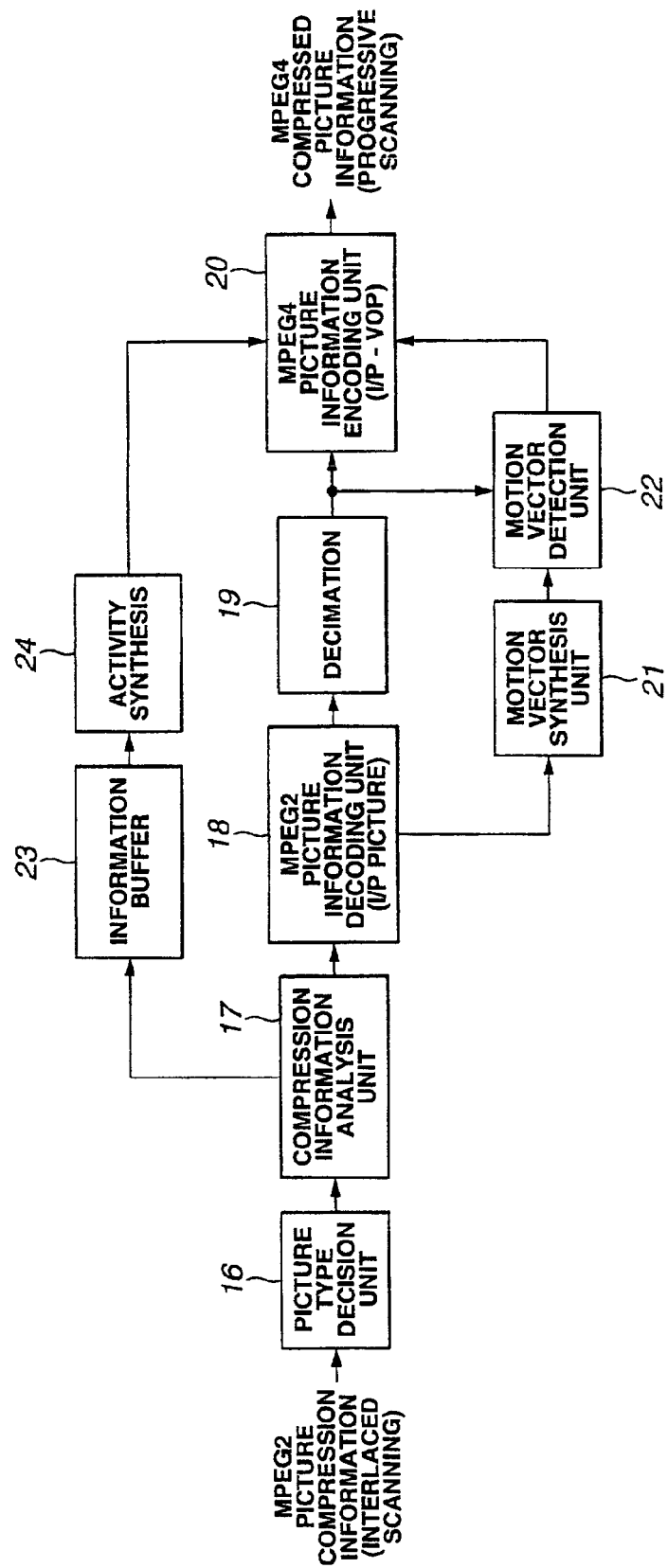
FIG. 6 is a flowchart showing the operating principle of a conventional encoding controlling system.

Referring to FIG. 6, the present picture information converting apparatus includes a picture type decision unit 16, a compressed information analysis unit 17, MPEG2 picture information decoding unit (I/P picture) 18, a decimating unit 19, MPEG4 picture information encoding unit (I/P-VOP) 20, a motion vector synthesis unit 21, a motion vector detection unit 22, an information buffer 23 and an activity synthesis unit 24. In the picture information converting apparatus of the first embodiment, shown in FIG. 3, the macroblock-based activity information in the input MPEG2 compressed picture information (bitstream) is extracted in the MPEG2 picture information decoding unit (I/P) 8 and the one-frame delay is introduced in the delay buffer 10; whereas, in the present picture information converting apparatus, the macroblock-based activity information in the input MPEG2 compressed picture information (bitstream) is extracted, at the same time as the one-frame delay is introduced, in the compressed information analysis unit 17.

Other features of the present embodiment are the same as those of the first embodiment described above and are not explained for clarity.

In the above-described embodiment, the macroblock-based information in the input MPEG2 compressed picture information (bitstream) extracted in the MPEG2 picture information decoding unit (I/P picture) is used to reduce the processing volume to realize stabilized code rate control.

In the foregoing, the MPEG2 compressed picture information (bitstream) and the MPEG4 compressed picture information (bitstream) are used as the input and the output, respectively. However, the input or the output is not limited to these and may also be other types of compressed picture information (bitstream), such as MPEG- 1 or H.263.

What is claimed is:

1. A picture information converting apparatus for converting interlaced scanned input compressed picture information, compressed in accordance with a first compression coding system, into progressive scanned output compressed picture information, compressed in accordance with a second compression coding system, comprising:

synthesis means for synthesizing second activity information of a pixel block constituting a frame of said output compressed picture information using first activity information constituting a frame of said input compressed picture information and calculating third activity information based on the average value of said second activity information; and encoding means for encoding using said seeond third activity information as a parameter of adaptive quantization at a time of compression in said second compression encoding system.

2. The picture information converting apparatus according to claim 1 wherein said first activity information is quantization scale information allocated to each pixel block of said input compressed picture information.

3. The picture information converting apparatus according to claim 1 wherein said first activity information is code volume allocated to each pixel block of said input compressed picture information.

4. The picture information converting apparatus according to claim 1 wherein said first activity information is the code volume allocated to DCT coefficients of each pixel block of said input compressed picture information.

5. The picture information converting apparatus according to claim 1 wherein said first activity information is the code volume allocated to each pixel block of luminance components of said input compressed picture information.

6. The picture information converting apparatus according to claim 1 wherein said first activity information is a parameter afforded to each pixel block of said input compressed picture information by the following equation:

$$X = Q \cdot B$$

where Q is the quantization scale allocated to each block, B is allocated code volume and X is the parameter.

7. The picture information converting apparatus according to claim 6 wherein said allocated code volume is the code volume allocated to each pixel block of said input compressed picture information.

8. The picture information converting apparatus according to claim 6 wherein said allocated code volume is the code volume allocated to the DCT coefficients of each pixel block of said input compressed picture information.

9. The picture information converting apparatus according to claim 6 wherein said allocated code volume is the DCT coefficients of the luminance components of each pixel block of said input compressed picture information.

10. The picture information converting apparatus according to claim 1 wherein said first activity information is non-zero DCT coefficients in said input compressed picture information.

11. The picture information converting apparatus according to claim 1 wherein said first activity information is the DCT coefficients of non-zero luminance components in said input compressed picture information.

12. The picture information converting apparatus according to claim 1 wherein said synthesis means synthesizes the second activity information from one pixel block in said output compressed picture information to another using an average value of the first activity information from one pixel block in said input compressed picture information to another.

13. The picture information converting apparatus according to claim 1 wherein said synthesis means synthesizes the second activity information from one pixel block in said output compressed picture information to another using a minimum value of the first activity information from one pixel block in said input compressed picture information to another.

14. The picture information converting apparatus according to claim 1 wherein said first compression encoding system is MPEG2, said second compression encoding system is MPEG4, and said synthesis means calculates the first activity information from one pixel block to another and also calculates an average value of said first activity information over an entire VOP corresponding to a picture of said output compressed picture information.

15. The picture information converting apparatus according to claim 14 wherein normalized activity is calculated in accordance with a following equation:

$$Nact_j = \frac{2 \times Act_j + \text{Avg\_act}}{Act_j + 2 \times \text{Avg\_act}}$$

where $Act_j$ is the first activity information of a jth pixel block, Avg—act is an average value of the first activity information over the entire VOP and Nact is the normalized activity of the jth pixel block.

16. The picture information converting apparatus according to claim 1 wherein said first compression encoding system is MPEG2 and said second compression encoding system is MPEG4 and wherein a delay buffer is provided for delaying the input compressed picture information for a period corresponding to a VOP equivalent to a picture of said output compressed picture information.

17. The picture information converting apparatus according to claim 1, further comprising picture analysis means for extracting the first activity information for one frame in said input compressed picture information and delaying said input compressed picture information for one frame period.

18. A picture information converting method for converting interlaced scanned input compressed picture information, compressed in accordance with a first compression coding system, into progressive scanned output compressed picture information, compressed in accordance with a second compression coding system, comprising the steps of:

synthesizing second activity information of a pixel block constituting a frame of said output compressed picture information using first activity information constituting a frame of said input compressed picture information and calculating third activity information based on the average value of said second activity information; and encoding using said second third activity information as a parameter of adaptive quantization at a time of compression in said second compression encoding system.

19. The picture information converting method according to claim 18 wherein the second activity information from one pixel block in said output compressed picture information to another is synthesized by using an average value of the first activity information from one pixel block in said input compressed picture information to another.

20. The picture information converting method according to claim 18 wherein the second activity information from one pixel block in said output compressed picture information to another is synthesized by using a minimum value of the first activity information from one pixel block in said input compressed picture information to another.

21. The picture information converting method according to claim 18, further comprising the step of extracting the first activity information for one frame in said input compressed picture information and delaying said input compressed picture information for one frame period.

* * * * *

UNITED STATES PATENT AND TRADEMARK OFFICE
CERTIFICATE OF CORRECTION

PATENT NO. : 7,012,959 B2
APPLICATION NO. : 09/862421
DATED : March 14, 2006
INVENTOR(S) : Kazushi Sato It is certified that error appears in the above-identified patent and that said Letters Patent is hereby corrected as shown below:

Column 11:
Line 40, "second third" should read -- third --.
Line 67, "parameter" should -- parameters --.

Column 12:
Line 51, "Avg-act" should read -- Avg_act --.
Line 52, "Nact" should read -- Nact$_j$ -- and "n ormalized" should read -- normalized --.
Line 53, "ofthe" should read -- of the --.

Column 13:
Line 12, "second third" should read -- third --.

Signed and Sealed this

Twenty-fourth Day of October, 2006

JON W. DUDAS
*Director of the United States Patent and Trademark Office*